US008329621B2

(12) United States Patent
Munoz, Jr. et al.

(10) Patent No.: US 8,329,621 B2
(45) Date of Patent: *Dec. 11, 2012

(54) DEGRADABLE PARTICULATES AND ASSOCIATED METHODS

(75) Inventors: Trinidad Munoz, Jr., Duncan, OK (US); Kirk Schreiner, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 1132 days.

This patent is subject to a terminal disclaimer.

(21) Appl. No.: 11/784,579

(22) Filed: Apr. 6, 2007

(65) Prior Publication Data

US 2008/0027157 A1 Jan. 31, 2008

Related U.S. Application Data

(63) Continuation-in-part of application No. 11/522,345, filed on Sep. 15, 2006, which is a continuation-in-part of application No. 11/492,642, filed on Jul. 25, 2006, now abandoned.

(51) Int. Cl.
*C09K 8/60* (2006.01)
(52) U.S. Cl. ............ 507/219; 424/426; 166/305.1
(58) Field of Classification Search .......... 507/219; 166/305.1; 424/426
See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Palmer | 260/78.3 |
| 3,173,484 A | 3/1965 | Huitt et al. | 166/280.1 |
| 3,195,635 A | 7/1965 | Fast | 166/280.1 |
| 3,272,650 A | 9/1966 | MacVittie | 134/7 |
| 3,302,719 A | 2/1967 | Fischer | 166/280.2 |
| 3,364,995 A | 1/1968 | Atkins et al. | 166/280.1 |
| 3,366,178 A | 1/1968 | Malone et al. | 166/280.1 |
| 3,455,390 A | 7/1969 | Gallus | 166/295 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,836,465 A | 9/1974 | Rhudy et al. | |
| 3,868,998 A | 3/1975 | Lybarger et al. | 166/278 |
| 3,912,692 A | 10/1975 | Casey et al. | 260/78.3 |
| 3,948,672 A | 4/1976 | Harnsberger | 106/90 |
| 3,955,993 A | 5/1976 | Curtice | 106/90 |

(Continued)

FOREIGN PATENT DOCUMENTS

EP  0 510 762 B1  10/1992

(Continued)

OTHER PUBLICATIONS

Kiyoshi Matsuyama et al, Environmentally benign formation of polymeric microspheres by rapid expansion of supercritical carbon dioxide solution with a nonsolvent, Environ Sci Technol2001, 35, 4149-4155.

(Continued)

*Primary Examiner* — Alicia Toscano
(74) *Attorney, Agent, or Firm* — Robert A. Kent; McDermott Will & Emery LLP

(57) ABSTRACT

Methods that include a method comprising: providing a degradable polymer, a viscosifier, and one solvent; combining the degradable polymer and the solvent to form a degradable polymer composition; allowing the degradable polymer to at least partially plasticize; and applying sufficient shear to the degradable polymer composition so that degradable particulates begin to form. Additional methods are also provided.

20 Claims, 2 Drawing Sheets

U.S. PATENT DOCUMENTS

| | | | |
|---|---|---|---|
| 3,960,736 A | 6/1976 | Free et al. | 252/8.55 R |
| 3,968,840 A | 7/1976 | Tate | 166/280.1 |
| 3,986,355 A | 10/1976 | Klaeger | |
| 3,998,272 A | 12/1976 | Maly | 166/281 |
| 3,998,744 A | 12/1976 | Arnold et al. | 507/269 |
| 4,010,071 A | 3/1977 | Colegrove | |
| 4,068,718 A | 1/1978 | Cooke, Jr. et al. | 166/280.2 |
| 4,169,798 A | 10/1979 | DeMartino | 252/8.55 R |
| 4,172,066 A | 10/1979 | Zweigle et al. | 260/29.6 TA |
| 4,261,421 A | 4/1981 | Watanabe | 166/281 |
| 4,265,673 A | 5/1981 | Pace et al. | |
| 4,299,825 A | 11/1981 | Lee | |
| 4,387,769 A | 6/1983 | Erbstoesser et al. | 166/295 |
| 4,460,052 A | 7/1984 | Gockel | 175/72 |
| 4,470,915 A | 9/1984 | Conway | 252/8.55 R |
| 4,498,995 A | 2/1985 | Gockel | 252/8.5 LC |
| 4,499,214 A | 2/1985 | Sortwell | |
| 4,502,540 A | 3/1985 | Byham | |
| 4,506,734 A | 3/1985 | Nolte | |
| 4,521,316 A | 6/1985 | Sikorski | |
| 4,526,695 A | 7/1985 | Erbstoesser et al. | 252/8.55 R |
| 4,632,876 A | 12/1986 | Laird et al. | |
| 4,694,905 A | 9/1987 | Armbruster | 166/280 |
| 4,715,967 A | 12/1987 | Bellis | 252/8.551 |
| 4,716,964 A | 1/1988 | Erbstoesser et al. | 166/284 |
| 4,767,706 A | 8/1988 | Levesque | |
| 4,772,346 A | 9/1988 | Anderson et al. | |
| 4,785,884 A | 11/1988 | Armbruster | 166/280 |
| 4,793,416 A | 12/1988 | Mitchell | |
| 4,797,262 A | 1/1989 | Dewitz | 422/142 |
| 4,809,783 A | 3/1989 | Hollenbeck et al. | 166/307 |
| 4,817,721 A | 4/1989 | Pober | 166/295 |
| 4,822,500 A | 4/1989 | Dobson, Jr. et al. | |
| 4,829,100 A | 5/1989 | Murphey et al. | |
| 4,836,940 A | 6/1989 | Alexander | |
| 4,843,118 A | 6/1989 | Lai et al. | 524/555 |
| 4,848,467 A | 7/1989 | Cantu et al. | 166/281 |
| 4,863,980 A | 9/1989 | Cowan et al. | |
| 4,886,354 A | 12/1989 | Welch et al. | 356/70 |
| 4,894,231 A | 1/1990 | Moreau et al. | |
| 4,957,165 A | 9/1990 | Cantu et al. | 166/295 |
| 4,961,466 A | 10/1990 | Himes et al. | 166/250 |
| 4,986,353 A | 1/1991 | Clark et al. | 166/279 |
| 4,986,354 A | 1/1991 | Cantu et al. | 166/279 |
| 4,986,355 A * | 1/1991 | Casad et al. | 166/295 |
| 5,034,139 A | 7/1991 | Reid et al. | |
| 5,082,056 A | 1/1992 | Tackett, Jr. | 166/295 |
| 5,142,023 A | 8/1992 | Gruber et al. | 528/354 |
| 5,152,781 A | 10/1992 | Tang et al. | |
| 5,161,615 A | 11/1992 | Hutchins et al. | |
| 5,203,834 A | 4/1993 | Hutchins et al. | |
| 5,213,446 A | 5/1993 | Dovan | |
| 5,216,050 A | 6/1993 | Sinclair | 524/108 |
| 5,247,059 A | 9/1993 | Gruber et al. | 528/354 |
| 5,249,628 A | 10/1993 | Surjaatmadja | 166/305 |
| 5,251,697 A | 10/1993 | Shuler | |
| 5,295,542 A | 3/1994 | Cole et al. | 166/278 |
| 5,304,620 A | 4/1994 | Holtmyer et al. | |
| 5,314,031 A | 5/1994 | Hale et al. | |
| 5,325,923 A | 7/1994 | Surjaatmadja et al. | 166/308 |
| 5,330,005 A | 7/1994 | Card et al. | 166/280 |
| 5,359,026 A | 10/1994 | Gruber | 528/354 |
| 5,360,068 A | 11/1994 | Sprunt et al. | 166/259 |
| 5,363,916 A | 11/1994 | Himes et al. | 166/276 |
| 5,373,901 A | 12/1994 | Norman et al. | 166/300 |
| 5,386,874 A | 2/1995 | Laramay et al. | 166/300 |
| 5,396,957 A | 3/1995 | Surjaatmadja et al. | 166/308 |
| 5,402,846 A | 4/1995 | Jennings, Jr. et al. | 166/259 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/354 |
| 5,487,897 A | 1/1996 | Polson et al. | |
| 5,492,177 A | 2/1996 | Yeh et al. | |
| 5,496,557 A | 3/1996 | Feijen et al. | |
| 5,497,830 A | 3/1996 | Boles et al. | 166/300 |
| 5,499,678 A | 3/1996 | Surjaatmadja et al. | 166/298 |
| 5,501,276 A | 3/1996 | Weaver et al. | |
| 5,505,787 A | 4/1996 | Yamaguchi | 134/4 |
| 5,512,071 A | 4/1996 | Yam et al. | 51/307 |
| 5,536,807 A | 7/1996 | Gruber et al. | 528/354 |
| 5,555,936 A | 9/1996 | Pirri et al. | |
| 5,591,700 A | 1/1997 | Harris et al. | 507/204 |
| 5,594,095 A | 1/1997 | Gruber et al. | 528/354 |
| 5,602,083 A | 2/1997 | Gabrysch et al. | |
| 5,604,186 A | 2/1997 | Hunt et al. | 507/204 |
| 5,607,905 A | 3/1997 | Dobson, Jr. et al. | 507/211 |
| 5,613,558 A | 3/1997 | Dillenbeck | |
| 5,670,473 A | 9/1997 | Scepanski | 510/445 |
| 5,697,440 A | 12/1997 | Weaver et al. | |
| 5,698,322 A | 12/1997 | Tsai et al. | 428/373 |
| 5,723,416 A | 3/1998 | Liao | |
| 5,765,642 A | 6/1998 | Surjaatmadja | 166/297 |
| 5,775,603 A | 7/1998 | Kohler et al. | |
| 5,783,527 A | 7/1998 | Dobson, Jr. et al. | |
| 5,791,415 A | 8/1998 | Nguyen et al. | 166/280 |
| 5,799,734 A | 9/1998 | Normal et al. | |
| 5,833,000 A | 11/1998 | Weaver et al. | 166/276 |
| 5,849,401 A | 12/1998 | El-Afandi et al. | 428/215 |
| 5,853,048 A | 12/1998 | Weaver et al. | 166/279 |
| 5,893,416 A | 4/1999 | Read | 166/304 |
| 5,908,073 A | 6/1999 | Nguyen et al. | 166/276 |
| 5,916,849 A | 6/1999 | House | |
| 5,924,488 A | 7/1999 | Nguyen et al. | 166/280 |
| 5,964,291 A | 10/1999 | Bourne et al. | 166/279 |
| 5,977,030 A | 11/1999 | House | |
| 5,979,557 A | 11/1999 | Card et al. | |
| 5,996,693 A | 12/1999 | Heathman | |
| 6,004,400 A | 12/1999 | Bishop et al. | 134/2 |
| 6,024,170 A | 2/2000 | McCabe et al. | 166/300 |
| 6,028,113 A | 2/2000 | Scepanski | 514/643 |
| 6,045,070 A | 4/2000 | Davenport | |
| 6,047,772 A | 4/2000 | Weaver et al. | 166/276 |
| 6,110,875 A | 8/2000 | Tjon-Joe-Pin et al. | |
| 6,114,410 A | 9/2000 | Betzold | 523/130 |
| 6,123,159 A | 9/2000 | Brookey et al. | |
| 6,123,965 A | 9/2000 | Jacob et al. | 424/489 |
| 6,131,661 A | 10/2000 | Conner et al. | 166/300 |
| 6,135,987 A | 10/2000 | Tsai et al. | 604/365 |
| 6,143,698 A | 11/2000 | Murphey et al. | 507/145 |
| 6,148,917 A | 11/2000 | Brookey et al. | |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,189,615 B1 | 2/2001 | Sydansk | 166/270 |
| 6,202,751 B1 | 3/2001 | Chatterji et al. | 166/276 |
| 6,209,643 B1 | 4/2001 | Nguyen et al. | 166/276 |
| 6,209,646 B1 | 4/2001 | Reddy et al. | 166/300 |
| 6,214,773 B1 | 4/2001 | Harris et al. | 507/271 |
| 6,242,390 B1 | 6/2001 | Mitchell et al. | 507/211 |
| 6,260,622 B1 | 7/2001 | Blok et al. | 166/305.1 |
| 6,291,013 B1 | 9/2001 | Gibson et al. | 427/213.3 |
| 6,300,286 B1 | 10/2001 | Dobson, Jr. et al. | |
| 6,302,209 B1 | 10/2001 | Thompson et al. | |
| 6,308,788 B1 | 10/2001 | Patel et al. | |
| 6,311,773 B1 | 11/2001 | Todd et al. | 166/280 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,330,917 B2 | 12/2001 | Chatterji et al. | |
| 6,357,527 B1 | 3/2002 | Norman et al. | 166/300 |
| 6,364,945 B1 | 4/2002 | Chatterji et al. | 106/677 |
| 6,380,138 B1 | 4/2002 | Ischy et al. | 507/204 |
| 6,387,986 B1 | 5/2002 | Moradi-Araghi et al. | 523/211 |
| 6,390,195 B1 | 5/2002 | Nguyen et al. | 166/276 |
| 6,394,185 B1 | 5/2002 | Constien | 166/296 |
| 6,422,314 B1 | 7/2002 | Todd et al. | 166/312 |
| 6,422,326 B1 | 7/2002 | Brookey et al. | |
| 6,432,155 B1 | 8/2002 | Swazey et al. | |
| 6,454,003 B1 | 9/2002 | Chang et al. | 166/270 |
| 6,485,947 B1 | 11/2002 | Rajgarhia et al. | 435/139 |
| 6,488,763 B2 | 12/2002 | Brothers et al. | 106/692 |
| 6,494,263 B2 | 12/2002 | Todd | 166/312 |
| 6,508,305 B1 | 1/2003 | Brannon et al. | 166/293 |
| 6,509,301 B1 | 1/2003 | Vollmer et al. | 507/236 |
| 6,527,051 B1 | 3/2003 | Reddy et al. | 166/300 |

| | | | |
|---|---|---|---|
| 6,554,071 B1 | 4/2003 | Reddy et al. ................. 166/293 |
| 6,566,310 B2 | 5/2003 | Chan |
| 6,569,814 B1 | 5/2003 | Brady et al. ................. 507/201 |
| 6,578,630 B2 | 6/2003 | Simpson et al. |
| 6,599,863 B1 | 7/2003 | Palmer et al. ................. 507/219 |
| 6,667,279 B1 | 12/2003 | Hessert et al. ................. 507/225 |
| 6,669,771 B2 | 12/2003 | Tokiwa et al. ................. 106/162.7 |
| 6,681,856 B1 | 1/2004 | Chatterji et al. ................. 166/294 |
| 6,686,328 B1 | 2/2004 | Binder ................. 510/446 |
| 6,691,780 B2 | 2/2004 | Nguyen et al. |
| 6,702,023 B1 | 3/2004 | Harris et al. ................. 166/307 |
| 6,710,019 B1 | 3/2004 | Sawdon et al. ................. 507/136 |
| 6,716,797 B2 | 4/2004 | Brookey |
| 6,737,385 B2 | 5/2004 | Todd et al. |
| 6,761,218 B2 | 7/2004 | Nguyen et al. ................. 166/278 |
| 6,763,888 B1 | 7/2004 | Harris et al. ................. 166/305.1 |
| 6,764,981 B1 | 7/2004 | Eoff et al. |
| 6,793,018 B2 | 9/2004 | Dawson et al. ................. 166/300 |
| 6,793,730 B2 | 9/2004 | Reddy et al. |
| 6,806,235 B1 | 10/2004 | Mueller et al. |
| 6,817,414 B2 | 11/2004 | Lee ................. 166/278 |
| 6,818,594 B1 | 11/2004 | Freeman et al. |
| 6,837,309 B2 | 1/2005 | Boney et al. ................. 166/280.2 |
| 6,883,608 B2 | 4/2005 | Parlar et al. |
| 6,896,058 B2 | 5/2005 | Munoz, Jr. et al. ............ 166/279 |
| 6,904,971 B2 | 6/2005 | Brothers et al. |
| 6,949,491 B2 | 9/2005 | Cooke, Jr. ................. 507/219 |
| 6,959,767 B2 | 11/2005 | Horton et al. |
| 6,978,838 B2 | 12/2005 | Parlar et al. |
| 6,981,552 B2 | 1/2006 | Reddy et al. |
| 6,983,801 B2 | 1/2006 | Dawson et al. ................. 166/300 |
| 6,987,083 B2 | 1/2006 | Phillippi et al. |
| 6,997,259 B2 | 2/2006 | Nguyen ................. 166/276 |
| 7,007,752 B2 | 3/2006 | Reddy et al. |
| 7,021,377 B2 | 4/2006 | Todd et al. ................. 166/278 |
| 7,032,663 B2 | 4/2006 | Nguyen ................. 166/276 |
| 7,036,586 B2 | 5/2006 | Roddy et al. ................. 166/277 |
| 7,036,587 B2 | 5/2006 | Munoz, Jr. et al. ............ 166/279 |
| 7,044,220 B2 | 5/2006 | Nguyen et al. ................. 166/279 |
| 7,044,224 B2 | 5/2006 | Nguyen ................. 166/292 |
| 7,063,151 B2 | 6/2006 | Nguyen et al. |
| 7,066,258 B2 | 6/2006 | Justus et al. ................. 166/295 |
| 7,069,994 B2 | 7/2006 | Cooke, Jr. |
| 7,080,688 B2 | 7/2006 | Todd et al. ................. 166/304 |
| 7,093,664 B2 | 8/2006 | Todd et al. ................. 166/376 |
| 7,096,947 B2 | 8/2006 | Todd et al. ................. 166/283 |
| 7,101,829 B2 | 9/2006 | Guichard et al. |
| 7,131,491 B2 | 11/2006 | Blauch et al. ................. 166/280 |
| 7,140,438 B2 | 11/2006 | Frost et al. ................. 166/307 |
| 7,147,067 B2 | 12/2006 | Getzlaf et al. |
| 7,151,077 B2 | 12/2006 | Prud'homme et al. |
| 7,156,174 B2 | 1/2007 | Roddy et al. ................. 166/293 |
| 7,165,617 B2 | 1/2007 | Lord et al. |
| 7,168,489 B2 | 1/2007 | Frost et al. ................. 166/278 |
| 7,172,022 B2 | 2/2007 | Reddy et al. ................. 166/292 |
| 7,178,596 B2 | 2/2007 | Blauch et al. ................. 166/280 |
| 7,195,068 B2 | 3/2007 | Todd |
| 7,204,312 B2 | 4/2007 | Roddy et al. |
| 7,219,731 B2 | 5/2007 | Sullivan et al. ................. 166/278 |
| 7,228,904 B2 | 6/2007 | Todd et al. |
| 7,256,159 B2 | 8/2007 | Guichard et al. |
| 7,261,156 B2 | 8/2007 | Nguyen et al. |
| 7,264,051 B2 | 9/2007 | Nguyen et al. |
| 7,267,170 B2 | 9/2007 | Mang et al. |
| 7,299,876 B2 | 11/2007 | Lord et al. |
| 7,303,014 B2 | 12/2007 | Reddy et al. |
| 7,306,037 B2 | 12/2007 | Nguyen et al. |
| 7,322,412 B2 | 1/2008 | Badalamenti et al. |
| 7,353,876 B2 | 4/2008 | Savery et al. |
| 7,353,879 B2 | 4/2008 | Todd et al. |
| 7,413,017 B2 | 8/2008 | Nguyen et al. |
| 7,448,450 B2 | 11/2008 | Luke et al. |
| 7,455,112 B2 | 11/2008 | Moorehead et al. |
| 7,461,697 B2 | 12/2008 | Todd et al. |
| 7,475,728 B2 | 1/2009 | Pauls et al. |
| 7,484,564 B2 | 2/2009 | Welton et al. |
| 7,497,258 B2 | 3/2009 | Savery et al. |
| 7,497,278 B2 | 3/2009 | Schriener et al. |
| 7,506,689 B2 | 3/2009 | Surjaatmadja et al. |
| 7,547,665 B2 | 6/2009 | Welton et al. |
| 7,595,280 B2 | 9/2009 | Welton et al. |
| 7,598,208 B2 | 10/2009 | Todd |
| 7,608,566 B2 | 10/2009 | Saini et al. |
| 7,608,567 B2 | 10/2009 | Saini |
| 2001/0016562 A1 | 8/2001 | Muir et al. ................. 507/201 |
| 2002/0036088 A1 | 3/2002 | Todd ................. 166/300 |
| 2002/0119169 A1 | 8/2002 | Angel et al. |
| 2002/0125012 A1 | 9/2002 | Dawson et al. ................. 166/300 |
| 2003/0054962 A1 | 3/2003 | England et al. |
| 2003/0060374 A1 | 3/2003 | Cooke, Jr. ................. 507/200 |
| 2003/0114314 A1 | 6/2003 | Ballard et al. ................. 507/100 |
| 2003/0130133 A1 | 7/2003 | Vollmer ................. 507/100 |
| 2003/0147965 A1 | 8/2003 | Bassett et al. |
| 2003/0188766 A1 | 10/2003 | Banerjee et al. ................. 134/7 |
| 2003/0230407 A1 | 12/2003 | Vijn et al. |
| 2003/0234103 A1 | 12/2003 | Lee et al. ................. 166/293 |
| 2004/0014606 A1 | 1/2004 | Parlar et al. |
| 2004/0014607 A1 | 1/2004 | Sinclair et al. ................. 507/200 |
| 2004/0040706 A1 | 3/2004 | Hossaini et al. ................. 166/278 |
| 2004/0055747 A1 | 3/2004 | Lee ................. 166/278 |
| 2004/0070093 A1 | 4/2004 | Mathiowitz et al. ................. 264/4 |
| 2004/0094300 A1 | 5/2004 | Sullivan et al. ............ 166/308.1 |
| 2004/0099416 A1 | 5/2004 | Vijn et al. |
| 2004/0106525 A1 | 6/2004 | Willbert et al. ................. 507/200 |
| 2004/0138068 A1 | 7/2004 | Rimmer et al. ................. 507/100 |
| 2004/0152601 A1 | 8/2004 | Still et al. ................. 507/100 |
| 2004/0152602 A1 | 8/2004 | Boles ................. 507/100 |
| 2004/0162386 A1 | 8/2004 | Altes et al. ................. 524/806 |
| 2004/0170836 A1 | 9/2004 | Bond et al. |
| 2004/0214724 A1 | 10/2004 | Todd et al. |
| 2004/0216876 A1 | 11/2004 | Lee ................. 166/280.1 |
| 2004/0231845 A1 | 11/2004 | Cooke, Jr. ................. 166/279 |
| 2004/0265014 A1* | 12/2004 | Takeuchi et al. ............ 399/274 |
| 2005/0028976 A1 | 2/2005 | Nguyen ................. 166/276 |
| 2005/0034861 A1 | 2/2005 | Saini et al. |
| 2005/0059556 A1 | 3/2005 | Munoz, Jr. et al. ............ 507/103 |
| 2005/0059557 A1 | 3/2005 | Todd et al. ................. 507/110 |
| 2005/0059558 A1 | 3/2005 | Blauch et al. ................. 507/203 |
| 2005/0103496 A1 | 5/2005 | Todd et al. ................. 166/278 |
| 2005/0126780 A1 | 6/2005 | Todd et al. ................. 166/280 |
| 2005/0126785 A1 | 6/2005 | Todd ................. 166/307 |
| 2005/0130848 A1 | 6/2005 | Todd et al. ................. 166/276 |
| 2005/0167104 A1 | 8/2005 | Roddy et al. ................. 166/279 |
| 2005/0183741 A1 | 8/2005 | Surjaatmadja et al. ............ 134/6 |
| 2005/0205266 A1 | 9/2005 | Todd et al. ................. 166/376 |
| 2005/0252659 A1 | 11/2005 | Sullivan et al. ............ 166/280.1 |
| 2005/0272613 A1 | 12/2005 | Cooke, Jr. ................. 507/219 |
| 2005/0277554 A1 | 12/2005 | Blauch et al. ................. 507/224 |
| 2006/0016596 A1 | 1/2006 | Pauls et al. ................. 166/276 |
| 2006/0032633 A1 | 2/2006 | Nguyen ................. 166/280 |
| 2006/0046938 A1 | 3/2006 | Harris et al. ................. 507/219 |
| 2006/0048938 A1 | 3/2006 | Kalman ................. 166/278 |
| 2006/0065397 A1 | 3/2006 | Nguyen et al. |
| 2006/0105917 A1 | 5/2006 | Munoz, Jr. ................. 507/103 |
| 2006/0105918 A1 | 5/2006 | Munoz, Jr. et al. |
| 2006/0108150 A1 | 5/2006 | Luke et al. |
| 2006/0169182 A1 | 8/2006 | Todd et al. |
| 2006/0169448 A1 | 8/2006 | Savery et al. |
| 2006/0169449 A1 | 8/2006 | Mang et al. |
| 2006/0169450 A1 | 8/2006 | Mang et al. ................. 507/219 |
| 2006/0169452 A1 | 8/2006 | Savery et al. |
| 2006/0169453 A1 | 8/2006 | Savery et al. |
| 2006/0172893 A1 | 8/2006 | Todd et al. |
| 2006/0172894 A1 | 8/2006 | Mang et al. ................. 507/200 |
| 2006/0172895 A1* | 8/2006 | Mang et al. ................. 507/219 |
| 2006/0185847 A1 | 8/2006 | Saini et al. |
| 2006/0185848 A1 | 8/2006 | Surjaatmadja et al. |
| 2006/0205608 A1 | 9/2006 | Todd |
| 2006/0234873 A1 | 10/2006 | Ballard |
| 2006/0243449 A1 | 11/2006 | Welton et al. |
| 2006/0247135 A1 | 11/2006 | Welton et al. |
| 2006/0254774 A1 | 11/2006 | Saini et al. |
| 2006/0258543 A1 | 11/2006 | Saini |
| 2006/0258544 A1 | 11/2006 | Saini |
| 2006/0276345 A1 | 12/2006 | Todd et al. |
| 2006/0283597 A1 | 12/2006 | Schriener et al. ............ 166/300 |
| 2007/0042912 A1 | 2/2007 | Welton et al. |
| 2007/0049501 A1 | 3/2007 | Saini et al. |

| | | | |
|---|---|---|---|
| 2007/0066492 | A1 | 3/2007 | Funkhouser et al. |
| 2007/0066493 | A1 | 3/2007 | Funkhouser et al. |
| 2007/0078063 | A1 | 4/2007 | Munoz, Jr. |
| 2007/0078064 | A1 | 4/2007 | Munoz et al. |
| 2007/0100029 | A1 | 5/2007 | Reddy et al. |
| 2007/0235190 | A1 | 10/2007 | Lord et al. |
| 2007/0238623 | A1 | 10/2007 | Saini et al. |
| 2007/0281868 | A1 | 12/2007 | Pauls et al. |
| 2007/0298977 | A1 | 12/2007 | Mang et al. |
| 2008/0026955 | A1 | 1/2008 | Munoz et al. |
| 2008/0026959 | A1 | 1/2008 | Munoz et al. |
| 2008/0026960 | A1 | 1/2008 | Munoz et al. |
| 2008/0070810 | A1 | 3/2008 | Mang |
| 2008/0139415 | A1 | 6/2008 | Todd et al. |
| 2008/0169102 | A1 | 7/2008 | Carbajal et al. |
| 2009/0062157 | A1 | 3/2009 | Munoz et al. |
| 2009/0258798 | A1 | 10/2009 | Munoz |

FOREIGN PATENT DOCUMENTS

| | | |
|---|---|---|
| EP | 0 879 935 A2 | 11/1998 |
| EP | 0879935 A3 | 10/1999 |
| EP | 1 413 710 A1 | 4/2004 |
| GB | 2 412 389 | 3/2004 |
| JP | 2004181820 A | 7/2004 |
| WO | WO 93/15127 A1 | 8/1993 |
| WO | WO 94/07949 A1 | 4/1994 |
| WO | WO 94/08078 A1 | 4/1994 |
| WO | WO 94/08090 A1 | 4/1994 |
| WO | WO 95/09879 A1 | 4/1995 |
| WO | WO 97/11845 A1 | 4/1997 |
| WO | WO 99/27229 | 6/1999 |
| WO | WO 00/57022 | 9/2000 |
| WO | WO 01/02698 | 1/2001 |
| WO | WO 01/87797 A1 | 11/2001 |
| WO | WO 01/94744 | 12/2001 |
| WO | WO 02/55843 A1 | 1/2002 |
| WO | WO 02/12674 A1 | 2/2002 |
| WO | WO 03/027431 A2 | 4/2003 |
| WO | WO 03/027431 A3 | 4/2003 |
| WO | WO 2004/007905 | 1/2004 |
| WO | WO 2004/037946 A1 | 5/2004 |
| WO | WO 2004/038176 A1 | 5/2004 |

OTHER PUBLICATIONS

U.S. Appl. No. 10/650,101, filed Aug. 26, 2003, Todd, et al.
U.S. Appl. No. 11/047,876, filed Jan. 31, 2005, Mang, et al.
U.S. Appl. No. 11/049,600, filed Feb. 2, 2005, Mang, et al.
Simmons, et al., *Poly(phenyllactide): Synthesis, Characterization, and Hydrolytic Degradation*, Biomacromolecules, vol. 2, No. 2, 2001 (pp. 658-663).
Yin, et al., *Preparation and Characterization of Substituted Polylactides*, American Chemical Society, vol. 32, No. 23, 1999 (pp. 7711-7718).
Yin, et al., *Synthesis and Properties of Polymers Derived form Substituted Lactic Acids*, American Chemical Society, Ch. 12, 2001 (pp. 147-159).
Cantu, et al, *Laboratory and Field Evaluation of a Combined Fluid-Loss-Control Additive and Gel Breaker for Fracturing Fluids*, SPE 18211, Society of Petroleum Engineers, 1990.
Love, et al, *Selectively Placing Many Fractures in Openhole Horizontal Wells Improves Production*, SPE 50422, Society of Petroleum Engineers, 1998.
McDaniel, et al, *Evolving New Stimulation Process Proves Highly Effective in Level 1 Dual-Lateral Completion*, SPE 78697, Society of Petroleum Engineers, 2002.
Albertsson, et al, *Aliphatic Polyesters: Systhesis, Properties and Applications*, Advances in Polymer Science, vol. 157, Degradable Aliphatic Polyesters, 2002.
Dechy-Cabaret, et al, *Controlled Ring-Opening Polymerization of Lactide and Glycolide*, American Chemical Society, Chemical Reviews, A-Z, AA-AD.
Funkhouser, et al, *Synthetic Polymer Fracturing Fluid for High-Temperature Applications*, SPE 80236, Society of Petroleum Engineers, 2003.
Vichaibun, et al, *A New Assay for the Enzymatic Degradation of Polylactic Acid, Short Report*, ScienceAsia, vol. 29, 2003 (pp. 297-300).
Halliburton, *SurgiFrac$^{SM}$ Service, A Quick and Cost-Effective Method to Help Boost Production From Openhole Horizontal Completions*, Halliburton Communications, HO3297, 2002.
Halliburton, *Cobra Frac$^{SM}$ Service, Coiled Tubing Fracturing—Cost-Effective Method for Stimulating Untapped Reserves*, HO2319R, Halliburton Energy Services, 2000.
Halliburton, *CobraJet Frac$^{SM}$ Service, Cost-effective Technology That Can Help Reduce Cost Per BOE Produced, Shorten Cycle Time and Reduce Capex*, Halliburton Communications.
Y. Chiang et al., *Hydrolysis of Ortho Esters; Further Investigation of the Factors Which Control the Rate-Determining Step*, Engineering Information, Inc. NY, NY, vol. 105, No. 23 (XP-002322842), Nov. 16, 1983.
M. Ahmad, et al., *Ortho Ester Hydrolysis: Direct Evidence for a Three-Stage Reaction Mechanism*, Engineering Information, Inc. NY, NY, vol. 101, No. 10 (XP-002322843), May 9, 1979.
Skrabal et al, *The Hydrolysis Rate of Orthoformic Acid Ethyl Ether*, Chemical Institute of the University of Graz, Jan. 13, 1921, pp. 1-38.
Heller, et al., *Poly(ortho esters)—From Concept to Reality*, Biomacromolecules, vol. 5, No. 5, 2004 (pp. 1625-1632), May 9, 1979.
Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).
Ng, et al., *Synthesis and Erosion Studies of Self-Catalyzed Poly(ortho ester)s*, American Chemical Society, vol. 30, No. 4, 1997 (pp. 770-772).
Ng, et al., *Development of a Poly(ortho ester) prototype With a Latent Acid in the Polymer Backbone for 5-fluorouracil Delivery*, Journal of Controlled Release 65 (2000), (pp. 367-374).
Rothen-Weinhold, et al., Release of BSA from poly(ortho ester) extruded thin strands, *Journal of Controlled Release 71*, 2001, (pp. 31-37).
Heller, et al., *Poly(ortho ester)s—their development and some recent applications*, European Journal of Pharmaceutics and Biopharmaceutics, 50, 2000, (pp. 121-128).
Heller, et al., *Poly(ortho esters); synthesis, characterization, properties and uses*, Advanced Drug Delivery Reviews, 54, 2002, (pp. 1015-1039).
Heller, et al., *Poly(ortho esters) for the Pulsed and Continuous Delivery of Peptides and Proteins*, Controlled Release and Biomedical Polymers Department, SRI International, (pp. 39-46).
Zignani, et al., *Subconjunctival biocompatibility of a viscous bioerodable poly(ortho ester)*, J. Biomed Mater Res, 39, 1998, pp. 277-285.
Toncheva, et al., *Use of Block Copolymers of Poly(Ortho Esters) and Poly (Ethylene Glycol)*, Journal of Drug Targeting, 2003, vol. 11(6), pp. 345-353.
Schwach-Abdellaoui, et al., *Control of Molecular Weight for Auto-Catalyzed Poly(ortho ester) Obtained by Polycondensation Reaction*, International Journal of Polymer Anal. Charact., 7: 145-161, 2002, pp. 145-161.
Heller, et al., *Release of Norethindrone from Poly(Ortho Esters)*, Polymer Engineering and Science, Mid-Aug. 1981, vol. 21, No. 11 (pp. 727-731).
Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.
Todd, et al., *A Chemcial "Trigger" Useful for Oilfield Applications*, Society of Petroleum Engineers, Inc., SPE 92709, Feb. 4, 2005.
NatureWorks Product Bulletin entitled NatureWorks PLA Polymer 3001D, Injection Molding Process Guide, 2005.
NatureWorks Product Bulletin entitled NatureWorks PLA Polymer 4060D, For Heat Seal Layer in Coextruded Oriented Films, 2005.
NatureWorks article entitled NatureWorks, Crystallizing and Drying of PLA, 2005.
Office Action for U.S. Appl. No. 11/522,345, dated Apr. 16, 2009.
Office Action for U.S. Appl. No. 11/492,642, dated Apr. 16, 2009.
Notice of Publication dated Jan. 31, 2008 from U.S. Appl. No. 11/900,025.

Chelating Agents, Encyclopedia of Chemical Technology, vol. 5 (764-795) Jul. 2004.
Office Action for U.S. Appl. No. 11/492,642 dated Jan. 28, 2010.
Office Action for U.S. Appl. No. 11/900,025 dated Feb. 5, 2010.
Office Action for U.S. Appl. No. 11/522,345, dated Oct. 9, 2009.
Office Action for U.S. Appl. No. 11/492,642, dated Oct. 9, 2009.
Office Action for U.S. Appl. No. 11/522,345 dated Feb. 24, 2010.
Office Action for U.S. Appl. No. 11/492,642 dated Apr. 28, 2010.

* cited by examiner

DEGRADABLE PARTICULATES AND ASSOCIATED METHODS

CROSS-REFERENCE TO RELATED APPLICATIONS

This application is a continuation-in-part of U.S. application Ser. No. 11/522,345 filed on Sep. 15, 2006, which is a continuation-in-part of U.S. application Ser. No. 11/492,642 filed on Jul. 25, 2006, now abandoned the entire disclosures of which are herein incorporated by reference.

BACKGROUND

The present invention generally relates to methods for producing degradable particulates, and methods related to the use of such degradable particulates in subterranean applications.

Degradable particulates comprise degradable materials (which are oftentimes degradable polymers) that are capable of undergoing an irreversible degradation when used in subterranean applications, e.g., in a well bore. As used herein, the terms "particulate" or "particulates" refer to a particle or particles that may have a physical shape of platelets, shavings, fibers, flakes, ribbons, rods, strips, spheroids, toroids, pellets, tablets, or any other suitable shape. The term "irreversible" as used herein means that the degradable material should degrade in situ (e.g., within a well bore) but should not recrystallize or reconsolidate in situ after degradation (e.g., in a well bore). The terms "degradation" or "degradable" refer to both of the two relatively extreme cases of hydrolytic degradation that the degradable material may undergo, e.g., heterogeneous (or bulk erosion) and homogeneous (or surface erosion), and any stage of degradation in between these two. This degradation can be a result of, inter alia, a chemical or thermal reaction, or a reaction induced by radiation. The terms "polymer" or "polymers" as used herein do not imply any particular degree of polymerization; for instance, oligomers are encompassed within this definition.

The degradability of a degradable polymer often depends, at least in part, on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and the like.

The physical properties of degradable polymers depend on several factors such as the composition of the repeat units, flexibility of the chain, presence of polar groups, molecular mass, degree of branching, crystallinity, orientation, etc. For example, short chain branches reduce the degree of crystallinity of polymers while long chain branches lower the melt viscosity and impart, inter alia, extensional viscosity with tension-stiffening behavior. The properties of the material utilized can be further tailored by blending, and copolymerizing it with another polymer, or by changing the macromolecular architecture (e.g., hyper-branched polymers, star-shaped, or dendrimers, etc.). The properties of any such suitable degradable polymers (e.g., hydrophobicity, hydrophilicity, rate of degradation, etc.) can be tailored by introducing select functional groups along the polymer chains.

Common methods that have been used to produce degradable particulates useful in subterranean applications (e.g., as acid precursors, fluid loss control particles, diverting agents, filter cake components, drilling fluid additives, cement additives, etc.) include, inter alia, emulsion methods and solution precipitation methods. To prepare degradable particulates using the emulsion method, typically a degradable polymeric material, such as poly(lactic acid), is dissolved in a halogenated solvent, e.g. methylene chloride, to form a polymeric solution and subsequently, water and a surfactant are then added to the polymeric solution at sufficient shear to form an emulsion. After formation of the emulsion, the solvent may then be removed from the emulsion by vacuum stripping or steam stripping, leaving behind essentially solvent-free particles of the polymer in the aqueous phase. The water is then removed and the particles may be collected by centrifugation, filtration, or spray-drying. Similarly, preparing degradable particulates with solution precipitation methods involves dissolution of a degradable polymer in a water miscible solvent to form a polymeric solution. Surfactants and/or water are then added to the polymeric solution with sufficient shear such that the solvent partitions from the polymeric solution, leaving behind essentially solvent-free particles of the polymer which may be collected by the same methods already discussed.

One problem associated with the current methods of producing degradable particulates is the necessity of surfactants and/or multiple solvents. Both the emulsion method and the solution precipitation method require the use of more than one solvent and/or surfactant. Furthermore, the halogenated solvents that may be used in these methods may pose health and environmental concerns. Thus, it may be beneficial and more cost-effective to have methods of producing degradable particulates that do not require the use of surfactants and/or multiple solvents, including halogenated solvents.

SUMMARY

The present invention generally relates to methods for producing degradable particulates, and methods related to the use of such degradable particulates in subterranean applications.

In one embodiment, the present invention provides a method comprising providing a degradable polymer, a viscosifier, and one solvent; combining the degradable polymer, the viscosifier, and the solvent to form a degradable polymer composition; allowing the degradable polymer to at least partially plasticize; and applying sufficient shear to the degradable polymer composition so that degradable particulates begin to form.

In another embodiment, the present invention provides a method comprising providing a degradable polymer, a viscosifier, and one solvent; combining the degradable polymer, the viscosifier, and the solvent to form a degradable polymer composition; allowing the degradable polymer to at least partially plasticize; applying sufficient shear to the degradable polymer composition so that degradable particulates begin to form; and incorporating at least a portion of the degradable particulates into a treatment fluid.

In another embodiment, the present invention provides a method comprising providing a degradable polymer, a viscosifier, and one solvent; combining the degradable polymer, the viscosifier, and the solvent to form a degradable polymer composition; allowing the degradable polymer to at least partially plasticize; applying sufficient shear to the degradable polymer composition so that degradable particulates begin to form; incorporating at least a portion of the degradable particulates into a gravel pack composition; and allowing the degradable particulates to degrade.

The features and advantages of the present invention will be readily apparent to those skilled in the art upon a reading of the description of the embodiments that follows.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
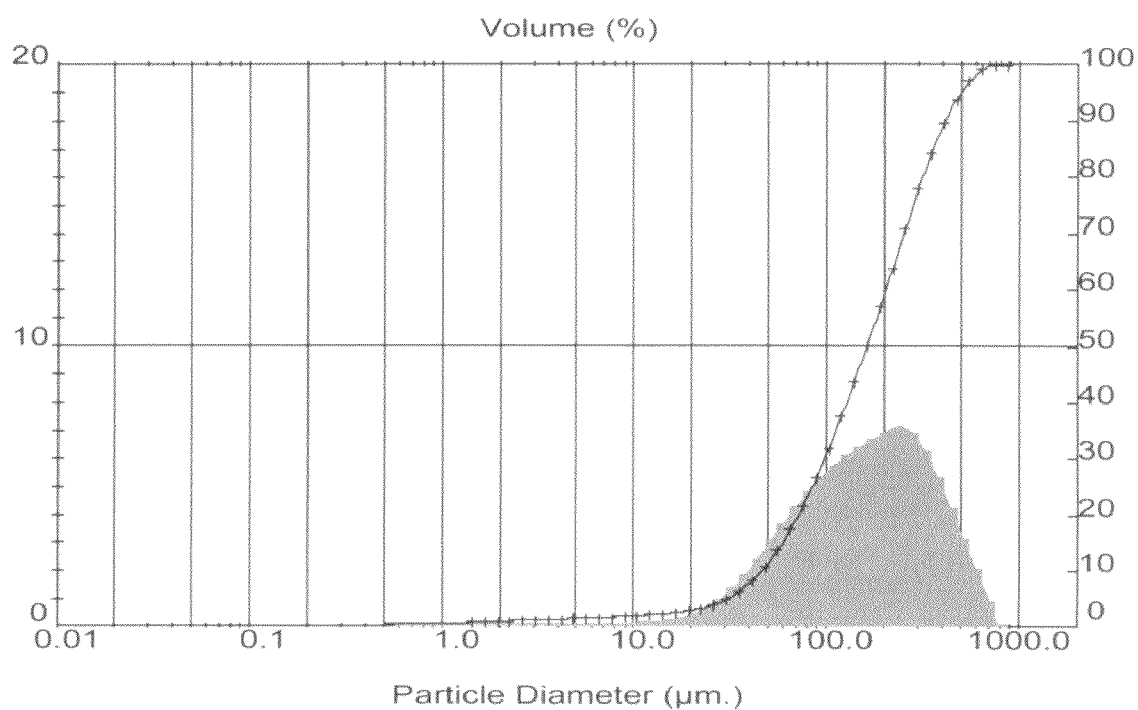
FIG. 1 graphically illustrates a particle size distribution of some degradable particulates produced as a result of the methods of the present invention.

The present invention generally relates to methods for producing degradable particulates, and methods related to the use of such degradable particulates in subterranean applications. One of the many advantages offered by the methods and compositions of the present invention is the ability to generate the degradable particulates of the present invention without the use of surfactants and/or multiple solvents. Additionally, another advantage is that the degradable particulates of the present invention may be generated without the use of halogenated solvents that may pose health and environmental concerns.

In accordance with the methods of the present invention, a degradable polymer is combined with one solvent and a viscosifier so as to form a degradable polymer composition. The solvent in the degradable polymer composition is then allowed to at least partially plasticize the degradable polymer. The term "plasticize," as used herein, refers to the softening or increasing in pliability of the degradable polymer. Optionally, the degradable polymer composition may be stirred and/or gently heated to facilitate the plasticizing of the degradable polymer. Any suitable mixing and/or heating device may be used.

After the degradable polymer has been at least partially plasticized, sufficient shear may then be applied to the degradable polymer composition so that degradable particulates begin to form. In some embodiments, the shear applied may be about 5000 revolutions per minute ("rpm") or higher. Any suitable shearing device may be used in these methods including, but not limited to, high speed dispersers, jet nozzles, in-line mixers (with various screens), and the like. One of the advantages of including a viscosifier in the degradable polymer composition of the present invention is that a viscosifier may provide a desired degree of solids suspension, such that the degradable polymer composition may be more easily transported to a suitable shearing device. In addition, a viscosifier may also provide lubricity to the degradable polymer composition, thereby aiding in the passage of degradable particulates through screens used during the high shear process.

Examples of suitable degradable polymers that may be used in conjunction with the methods of the present invention include, but are not limited to, aliphatic polyesters; poly(lactides); poly(glycolides); poly(ε-caprolactones); poly(hydroxy ester ethers); poly(hydroxybutyrates); poly(anhydrides); polycarbonates; poly(orthoesters); poly(amino acids); poly(ethylene oxides); poly(phosphazenes); poly ether esters, polyester amides, polyamides, and copolymers, combinations, or derivatives thereof. The term "copolymer" as used herein is not limited to the combination of two polymers, but includes any combination of polymers, e.g., terpolymers and the like. Of these suitable polymers, aliphatic polyesters such as poly(lactic acid), poly(anhydrides), poly(orthoesters), and poly(lactide)-co-poly(glycolide) copolymers are preferred. In some embodiments, the degradable polymer may be poly(lactic acid). In other embodiments, the degradable polymer may be poly(orthoesters). Other degradable polymers that are subject to hydrolytic degradation also may be suitable. The selection of an appropriate degradable polymer may depend on the particular application and the conditions involved. Other guidelines to consider include the degradation products that result, the time for required for the requisite degree of degradation, and the desired result of the degradation (e.g., voids). Also, the relative degree of crystallinity and amorphousness of a particular degradable polymer can affect the relative hardness of the degradable particulates. Examples of other suitable degradable polymers include those degradable polymers that release useful or desirable degradation products that are desirable, e.g., an acid. Such degradation products may be useful in a downhole application, e.g., to break a viscosified treatment fluid or to degrade an acid soluble component present therein (such as in a filter cake).

Suitable aliphatic polyesters may have the general formula of repeating units shown below:

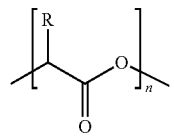

Formula I where n is an integer between 75 and 10,000 and R is a hydrogen, alkyl, aryl, alkylaryl, acetyl, heteroatoms, or mixtures thereof. Of these aliphatic polyesters, poly(lactide) is preferred. Poly(lactide) is synthesized either from lactic acid by a condensation reaction or more commonly by ring-opening polymerization of cyclic lactide monomer. Since both lactic acid and lactide can achieve the same repeating unit, the general term poly(lactic acid) as used herein refers to formula I without any limitation as to how the polymer was made such as from lactides, lactic acid, or oligomers, and without reference to the degree of polymerization or level of plasticization. The lactide monomer exists generally in three different forms: two stereoisomers L- and D-lactide and racemic D,L-lactide (meso-lactide). The oligomers of lactic acid, and oligomers of lactide are defined by the formula:

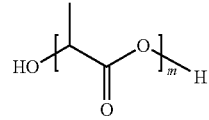

Formula II where m is an integer $2 \leq m \leq 75$. Preferably m is an integer and $2 \leq m \leq 10$. These limits correspond to number average molecular weights below about 5,400 and below about 720, respectively. The chirality of the lactide units provides a means to adjust, inter alia, degradation rates, as well as physical and mechanical properties. Poly(L-lactide), for instance, is a semicrystalline polymer with a relatively slow hydrolysis rate. This could be desirable in applications of the present invention where a slower degradation of the degradable particulates is desired. Poly(D,L-lactide) may be a more amorphous polymer with a resultant faster hydrolysis rate. This may be suitable for other applications where a more rapid degradation may be appropriate. The stereoisomers of lactic acid may be used individually or combined to be used in accordance with the present invention. Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers can be modified to be used in the present invention by, inter alia, blending, copolymerizing or otherwise mixing the stereoisomers, blending, copolymerizing or otherwise mixing high and low molecular weight poly(lactides), or by blending, copolymerizing or otherwise mixing a poly(lactide) with another polyester or polyesters.

Solvents suitable for use in the present invention should, among other things, at least partially plasticize the degradable polymer. For example, solvents suitable for use in the present invention may plasticize the degradable polymer thereby softening and/or increasing the pliability of the degradable polymer. Any solvent that is capable of plasticizing a degradable polymer may be suitable for use in the present invention. Examples of suitable solvents include, but are not limited to, aqueous fluids, including but not limited to, fresh water, salt water, brine, or seawater, or any other aqueous based fluid that does not adversely react with the other components used in accordance with this invention or with the subterranean formation; methanol; ethanol; propylene carbonate; propylene glycol; polyethylene glycol; isopropanol; polyhydric alcohols such as glycerol polyethylene oxide; oligomeric lactic acid; citrate esters (such as tributyl citrate oligomers, triethyl citrate, acetyltributyl citrate, and acetyltriethyl citrate); glucose monoesters; partially fatty acid esters; PEG monolaurate; triacetin; poly(e-caprolactone); poly(hydroxybutyrate); glycerin-1-benzoate-2,3-dilaurate; glycerin-2-benzoate-1,3-dilaurate; bis(butyl diethylene glycol)adipate; ethylphthalylethyl glycolate; glycerin diacetate monocaprylate; diacetyl monoacyl glycerol; polypropylene glycol (and epoxy derivatives thereof); poly(propylene glycol)dibenzoate, dipropylene glycol dibenzoate; glycerol; ethyl phthalyl ethyl glycolate; poly(ethylene adipate)distearate; di-iso-butyl adipate; and combinations or derivatives thereof. In some embodiments, the solvent may consist essentially of an aqueous fluid. The choice of which particular solvent to use may be determined by the particular degradable polymer, the concentration of the degradable polymer in the degradable polymer composition, and other similar factors. While the methods of the present invention only require the use of one solvent, in some embodiments, this solvent may be a combination of suitable solvents or a suitable solvent that has been diluted with an aqueous fluid.

In certain embodiments, the solvent should be included in an amount sufficient to at least partially plasticize the degradable polymer. In some embodiments, the solvent may be included in the degradable polymer composition in an amount in the range of from about 1% to about 99.9% by volume. In other embodiments, the solvent may be included in the degradable polymer composition in an amount in the range of from about 5% to about 80% by volume. In another embodiment, the solvent may be included in the degradable polymer composition in an amount in the range of from about 10% to about 50% by volume.

Additionally, while halogenated solvents such as chloroform, dichloromethane, 1,2-dichlorobenzene, dimethylformamide, etc. may be used to plasticize a degradable polymer, these solvents may not be desirable due to safety concerns, potential environmental issues, potential safety issues in terms of flash point and potential exposure, and relative cost.

Viscosifiers suitable for use in the present invention include, but are not limited to, biopolymers (e.g. xanthan, succinoglycan, and diutan), clarified biolpolymers, cellulose, cellulose derivatives (e.g. hydroxyethylcellulose), guar, and guar derivatives (e.g. hydroxypropyl guar). Commercially available examples of suitable viscosifiers include, but are not limited to, those that are available from Halliburton Energy Services, Inc., of Duncan, Okla., under the trade name "WG-37" and "N-VIS."

In certain embodiments, a viscosifier should be included in the degradable polymer composition in an amount sufficient to provide a desired degree of solids suspension or viscosity. In some embodiments, a viscosifier may be included in the degradable polymer composition in an amount in the range of from about 0.001% to about 2% by volume. In other embodiments, a viscosifier may be included in the degradable polymer composition in an amount in the range of from about 0.001% to about 1% by volume.

The average size distribution of the degradable particulates produced from the methods of the present invention may vary, depending on several factors. These factors include, but are not limited to, the type and/or amount of solvent used, the particular degradable polymer used, the molecular weight of the degradable polymer, the concentration of the degradable polymer in the degradable polymer composition, the amount of shear applied, the presence of certain additives, the temperature conditions, etc. The desired average particulate size distribution can be modified as desired by modifying any of these factors. One of ordinary skill in the art with the benefit of this disclosure will be able to identify the particular factor(s) to modify to achieve a desired particulate size distribution.

The degradable particulates of the present invention can be used in any subterranean application with or without a treatment fluid, depending on the use. As used herein, the term "treatment fluid" refers to any fluid that may be used in a subterranean application in conjunction with a desired function and/or for a desired purpose. The term "treatment fluid" does not imply any particular action by the fluid or any component thereof. One of ordinary skill in the art with the benefit of this disclosure will be able to recognize when the degradable particulates may or may not be used in conjunction with a treatment fluid. One consideration is the ability to incorporate the degradable particulates in the treatment fluid. Another consideration is the timing desired for the degradation of the degradable particulates. Another consideration is the concentration of degradable particulates needed in a chosen treatment fluid.

The degradable particulates may have differing properties, such as, relative hardness, pliability, degradation rate, etc. depending on the processing factors, the type of degradable polymer used, etc. The specific properties of the degradable particulates produced may vary by varying certain process parameters (including compositions), which will be evident to one of ordinary skill in the art with the benefit of this disclosure. Depending on the particular use, the degradable particulates may have several purposes, including, but not limited to, creating voids upon degradation, releasing certain desirable degradation products that may then be useful for a particular function, and/or temporarily restricting the flow of a fluid. Examples of subterranean applications in which the generated degradable particulates could be used include, but are not limited to, such applications as fluid loss control particles, as diverting agents, as filter cake components, as drilling fluid additives, as cement composition additives, or other acid-precursor components. Specific nonlimiting embodiments of some examples are discussed below.

In some methods, the degradable particulates may be used to increase the conductivity of a fracture. This may be accomplished by incorporating the degradable particulates into a fracturing fluid comprising proppant particulates, allowing the proppant particulates to form a proppant matrix within a fracture that comprises the degradable particulates, and allowing the degradable particulates to degrade to form voids within the proppant matrix. The term "proppant matrix" refers to some consolidation of proppant particulates.

In another example of a subterranean application, the degradable particulates may be used to divert a fluid within a subterranean formation.

In another example, the degradable particulates may be used in a composition designed to provide some degree of sand control to a portion of a subterranean formation. In an example of such a method, the degradable particulates may be incorporated into a cement composition which is placed down hole in a manner so as to provide some degree of sand control. An example of such a cement composition comprises a hydraulic cement, sufficient water to form a pumpable slurry, and the degradable particulates formed by a method of this invention. Optionally, other additives used in cementing compositions may be added.

In another example, the degradable particulates may be incorporated into a cement composition to be used in a primary cementing operation, such as cementing casing in a well bore penetrating a subterranean formation. An example of such a cement composition comprises a hydraulic cement, sufficient water to form a pumpable slurry, and the degradable particulates formed by a method of this invention. Optionally, other additives used in cementing compositions may be added.

In another example, the degradable particulates may be incorporated in a gravel pack composition. Upon degradation of the degradable particulates, any acid-based degradation products may be used to degrade an acid-soluble component in the subterranean formation, including but not limited to a portion of a filter cake situated therein.

In another example, the degradable particulates may be incorporated with a viscosified treatment fluid (e.g., a fracturing fluid or a gravel pack fluid) to act as a breaker for the viscosified treatment fluid (i.e., at least partially reduce the viscosity of the viscosified treatment fluid).

In another example, the degradable particulates may be used as self-degrading bridging agents in a filter cake.

In another example, the degradable particulates may be used as a fluid loss control additive for at least partially controlling or minimizing fluid loss during a subterranean treatment such as fracturing.

In another example, the degradable particulates may be used in conjunction with cleaning or cutting a surface in a subterranean formation.

To facilitate a better understanding of the present invention, the following examples of preferred embodiments are given. In no way should the following examples be read to limit, or to define, the scope of the invention.

Example 1

According to one embodiment of the present invention, degradable particulates were made by placing 100 grams ("g") of amorphous poly(lactic) acid in 1000 milliliters ("mL") of methanol. The resulting solution was then heated, with stirring, to no more than 110° F. and held for approximately 3 hours to plasticize the poly(lactic) acid. Thereafter, the methanol was decanted, leaving plasticized poly(lactic) acid and 500 mL of methanol was then added back to the plasticized poly(lactic). The solution was then sheared in a Silverson L4RT-A Lab Mixer with a large screen for approximately 5 minutes at 5500 rpm, 10 minutes at 7000 rpm and finally 9500 rpm for 10 minutes. The resulting degradable particulates were then collected by allowing them to settle to the bottom of the solution and decanting the methanol. Referring now to FIG. 1, the particle size distribution of the resulting degradable particulates is indicated. In addition, it can be seen that the median particle size produced was approximately 164 μm.

Example 2

Figure 2:
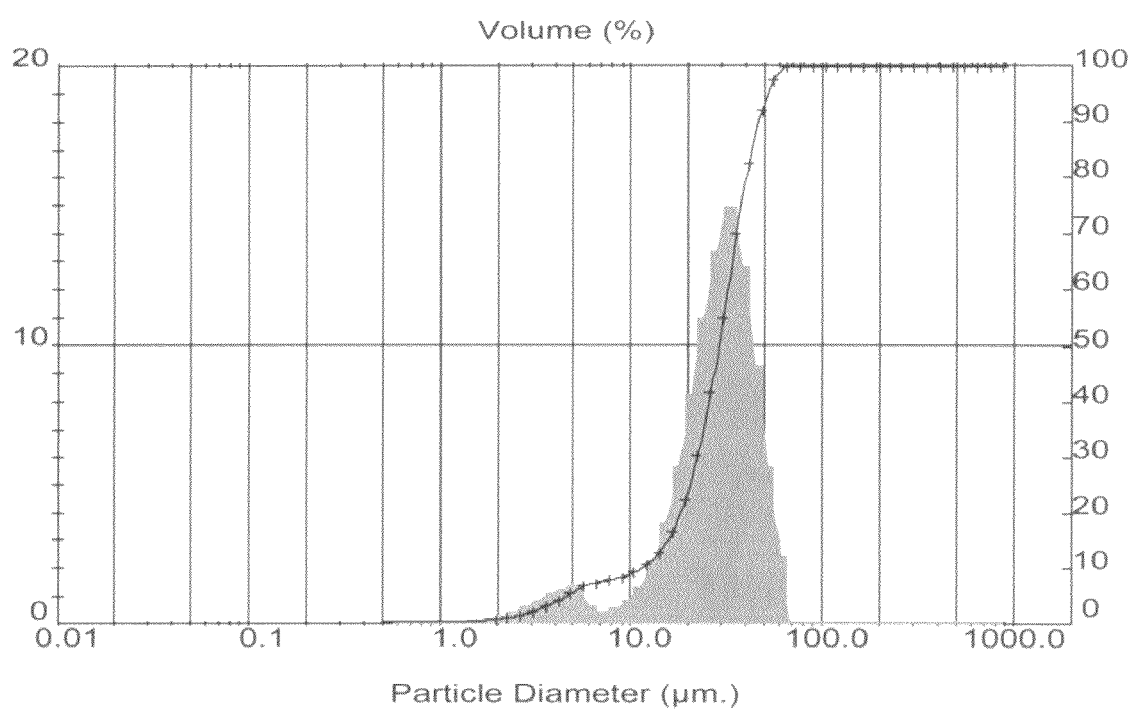
FIG. 2 graphically illustrates a particle size distribution of some degradable particulates produced as a result of the methods of the present invention.

According to one embodiment of the present invention, degradable particulates were made by placing 100 grams ("g") of crystalline poly(lactic) acid in 1000 milliliters ("mL") of fresh water. The solution was then sheared in a Silverson L4RT-A Lab Mixer with a large screen, having a hole diameter of approximately 0.056 inches, for approximately 5 minutes at 5500 rpm and 10 minutes at 7000 rpm. The large screen on the Lab Mixer was then replaced with a small screen, having a hole diameter of approximately 0.015 inches, and the solution was sheared at 9500 for 25-30 minutes. The resulting degradable particulates were then collected by allowing them to settle to the bottom of the solution and decanting the water. Referring now to FIG. 2, the particle size distribution of the resulting degradable particulates is indicated. In addition, it can be seen that the median particle size produced was approximately 30 μm.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. While numerous changes may be made by those skilled in the art, such changes are encompassed within the spirit of this invention as defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   providing a degradable polymer, a viscosifier, and one solvent, wherein the degradable polymer and the solvent are not the same;
   combining the degradable polymer, the viscosifier, and the solvent to form a degradable polymer composition;
   allowing the degradable polymer to at least partially plasticize; and
   applying sufficient shear to the degradable polymer composition so that degradable particulates begin to form.

2. The method of claim 1 wherein the solvent is a non-halogenated solvent.

3. The method of claim 1 wherein the step of allowing the degradable polymer to at least partially plasticize further comprises stirring and/or heating the degradable polymer composition.

4. The method of claim 1 wherein applying sufficient shear comprises applying shear in an amount of about 5000 revolutions per minute.

5. The method of claim 1 wherein the degradable polymer is selected from the group consisting of: aliphatic polyesters; poly(lactides); poly(glycolides); poly($\epsilon$-caprolactones); poly(hydroxy ester ethers); poly(hydroxybutyrates); poly(anhydrides); polycarbonates; poly(orthoesters); poly(amino acids); poly(ethylene oxides); poly(phosphazenes); poly ether esters; polyester amides; polyamides; and copolymers, combinations, or derivatives thereof.

6. The method of claim 1 wherein the degradable polymer is an aliphatic polyester selected from the group consisting of: poly(lactic acid), poly(anhydrides), poly(orthoesters), and poly(lactide)-co-poly(glycolide) copolymers.

7. The method of claim 1 wherein the solvent is selected from the group consisting of: fresh water; salt water; brine; seawater; methanol; ethanol; propylene carbonate; propylene glycol; polyethylene glycol; isopropanol; polyhydric alcohols; glycerol polyethylene oxide; oligomeric lactic acid; citrate esters; tributyl citrate oligomers; triethyl citrate; acetyltributyl citrate; acetyltriethyl citrate; glucose monoesters; partially fatty acid esters; polyethylene glycol monolaurate; triacetin; poly($\epsilon$-caprolactone); poly(hydroxybutyrate); glycerin-1-benzoate-2,3-dilaurate; glycerin-2-benzoate-1,3-dilaurate; bis(butyl diethylene glycol)adipate; ethylphthalylethyl glycolate; glycerin diacetate monocaprylate; diacetyl monoacyl glycerol; polypropylene glycol; epoxy derivatives of polypropylene glycol; poly(propylene glycol)dibenzoate, dipropylene glycol dibenzoate; glycerol; ethyl phthalyl ethyl glycolate; poly(ethylene adipate)distearate; di-iso-butyl adipate; and combinations or derivatives thereof.

8. The method of claim 1 wherein the viscosifier is selected from the group consisting of: xanthan, succinoglycan, diutan, cellulose, cellulose derivatives, guar, guar derivatives and combinations thereof.

9. The method of claim 1 wherein the viscosifier is present in the degradable polymer composition in an amount in the range of from about 0.001% to about 2% by volume.

10. The method of claim 1 further comprising using at least a portion of the degradable particulates in a subterranean application to divert a fluid within the subterranean formation.

11. The method of claim 1 further comprising incorporating at least a portion of the degradable particulates into a viscosified treatment fluid, the degradable particulates being capable of acting as a viscosity breaker for the viscosified treatment fluid.

12. The method of claim 1 further comprising incorporating at least a portion of the degradable particulates into a gravel pack.

13. The method of claim 1 further comprising incorporating at least a portion of the degradable particulates into a filter cake, at least a portion of the degradable particulates being capable of acting as degradable bridging agents in the filter cake.

14. The method of claim 1 further comprising incorporating at least a portion of the degradable particulates into a fracturing fluid that comprises proppant particulates; allowing a portion of the proppant particulates to form a proppant matrix that comprises at least a plurality of the degradable particulates within a fracture in a subterranean formation; and allowing the degradable particulates to degrade so as to form at least one void in the proppant matrix.

15. A method comprising:
providing a degradable polymer, a viscosifier, and one solvent, wherein the degradable polymer and the solvent are not the same;
combining the degradable polymer, the viscosifier, and the solvent to form a degradable polymer composition;
allowing the degradable polymer to at least partially plasticize;
applying sufficient shear to the degradable polymer composition so that degradable particulates begin to form; and
incorporating at least a portion of the degradable particulates into a treatment fluid.

16. The method of claim 15 wherein the degradable polymer is selected from the group consisting of: aliphatic polyesters; poly(lactides); poly(glycolides); poly($\epsilon$-caprolactones); poly(hydroxy ester ethers); poly(hydroxybutyrates); poly(anhydrides); polycarbonates; poly(orthoesters); poly(amino acids); poly(ethylene oxides); poly(phosphazenes); poly ether esters; polyester amides; polyamides; and copolymers, combinations, or derivatives thereof.

17. The method of claim 15 wherein the degradable polymer is an aliphatic polyester selected from the group consisting of poly(lactic acid), poly(anhydrides), poly(orthoesters), and poly(lactide)-co-poly(glycolide) copolymers.

18. A method comprising:
providing a degradable polymer, a viscosifier, and one solvent, wherein the degradable polymer and the solvent are not the same;
combining the degradable polymer, the viscosifier, and the solvent to form a degradable polymer composition;
allowing the degradable polymer to at least partially plasticize;
applying sufficient shear to the degradable polymer composition so that degradable particulates begin to form;
incorporating at least a portion of the degradable particulates into a gravel pack composition; and
allowing the degradable particulates to degrade.

19. The method of claim 18 wherein the degradable polymer is selected from the group consisting of: aliphatic polyesters; poly(lactides); poly(glycolides); poly($\epsilon$-caprolactones); poly(hydroxy ester ethers); poly(hydroxybutyrates); poly(anhydrides); polycarbonates; poly(orthoesters); poly(amino acids); poly(ethylene oxides); poly(phosphazenes); poly ether esters; polyester amides; polyamides; and copolymers, combinations, or derivatives thereof.

20. The method of claim 18 wherein the solvent further comprises at least one of the following: methanol; ethanol; propylene carbonate; propylene glycol; polyethylene glycol; isopropanol; polyhydric alcohols; glycerol polyethylene oxide; oligomeric lactic acid; citrate esters; tributyl citrate oligomers; triethyl citrate; acetyltributyl citrate; acetyltriethyl citrate; glucose monoesters; partially fatty acid esters; polyethylene glycol monolaurate; triacetin; poly($\epsilon$-caprolactone); poly(hydroxybutyrate); glycerin-1-benzoate-2,3-dilaurate; glycerin-2-benzoate-1,3-dilaurate; bis(butyl diethylene glycol)adipate; ethylphthalylethyl glycolate; glycerin diacetate monocaprylate; diacetyl monoacyl glycerol; polypropylene glycol; epoxy derivatives of polypropylene glycol; poly(propylene glycol)dibenzoate, dipropylene glycol dibenzoate; glycerol; ethyl phthalyl ethyl glycolate; poly(ethylene adipate)distearate; di-iso-butyl adipate; and combinations or derivatives thereof.

* * * * *